(12) United States Patent
Blackburn

(10) Patent No.: US 6,633,153 B1
(45) Date of Patent: Oct. 14, 2003

(54) UNDER VOLTAGE PROTECTION FOR A STARTER/ALTERNATOR

(75) Inventor: Scott Evart Blackburn, Temperance, MI (US)

(73) Assignee: Dana Corporation, Toledo, OH (US)

( * ) Notice: Subject to any disclaimer, the term of this patent is extended or adjusted under 35 U.S.C. 154(b) by 16 days.

(21) Appl. No.: 10/209,910

(22) Filed: Aug. 2, 2002

(51) Int. Cl.$^7$ .................................................. H02J 7/00
(52) U.S. Cl. ........................................ 320/132; 320/130
(58) Field of Search .............................. 320/132, 130, 320/134, 136, 137; 324/426

(56) References Cited

U.S. PATENT DOCUMENTS

| | | | |
|---|---|---|---|
| 4,149,093 A | 4/1979 | D'Alessio et al. | 307/10.7 |
| 4,180,770 A | 12/1979 | Eby | 324/429 |
| 6,111,731 A * | 8/2000 | Cepynsky et al. | 307/107 |
| 6,133,707 A | 10/2000 | Kikuchi et al. | 320/104 |
| 6,249,106 B1 | 6/2001 | Turner et al. | 320/136 |
| 6,396,161 B1 * | 5/2002 | Crecelius et al. | 290/36 R |

* cited by examiner

Primary Examiner—Lawrence Luk
(74) Attorney, Agent, or Firm—Liniak, Berenato & White

(57) ABSTRACT

The method is directed to preserve the starter/alternator in an IC engine installation from potential failure owing to insufficient electrical charge in the system energy storage device. The system controller monitors starter/alternator controller signals relating to energy storage device charge level and whether the starter/alternator is available for operation. When monitored charge is detected to be insufficient to operate the starter/alternator, the starter/alternator is disabled and the system controller provides this information to the vehicle operator as a warning signal that the starter/alternator is disabled. Once the operator has effected a remedy (i.e., recharging or replacing the energy charging device), the starter/alternator is again made available for operation.

4 Claims, 2 Drawing Sheets

UNDER VOLTAGE PROTECTION FOR A STARTER/ALTERNATOR

FIELD OF THE INVENTION

The invention relates to the field of automotive electrical systems. Specifically, the invention is directed to a method of limiting and disabling starter/alternator operation in starter/generator mode when an extreme low voltage condition is detected in the energy storage device of the system.

BACKGROUND OF THE INVENTION

The trend in automotive electrical systems has always been towards more power and higher voltages. At this time, an element of the trend involves the combination of the alternator and starter into a single IC engine driven unit. This combined starter/alternator can be driven either directly on the crankshaft of the IC engine as a part of the flywheel on one end or the balancer on the other. Alternatively, the starter/alternator can be mounted for gear, belt, or chain drive from the crankshaft of other IC engine driven component (waterpump/A/C compressor/power steering pump, etc.)

The starter/alternator has become more powerful not only for increasing power (current and voltage) but also for more rapid and more frequent starting cycles of the IC engine as enhanced operating efficiencies are sought. In pursuit of these goals, the starter/alternator has become more sophisticated in its control systems and its responsiveness to system requirements for both starter functions and generating functions.

In this regard, the starter/alternator, owing to its high power and current requirements, can rapidly deplete a system energy storage device that is not fully charged. The storage device may be experiencing a failure in the device itself, i.e., too many charge/discharge cycles, or the charging system may not be working properly to restore the device to sufficient charge capacity. Regardless of basis, however, if the energy storage device is not fully charged, or lacks sufficient reserve capacity to start the I.C. engine, and the starter/alternator none-the-less is engaged according to a demand cycle, the starter/alternator will rapidly deplete any remaining capacity in the system, thereby disabling all other electricity dependent systems in the vehicle (lights, communications, instruments, ventilation, etc.), and rendering he vehicle utterly inoperable and unsafe.

SUMMARY OF THE INVENTION

The present invention is directed to controlling the circumstance where the system energy storage device is not fully charged, or at least not sufficiently charged to engage the starter/alternator in starter mode. Upon sensing such a circumstance, the system controller disables the starter mode of the starter/alternator and provides a warning indication to the operator that the starter has been disabled. The operator, made aware of the condition, can seek a remedy by either replacing the energy storage device, re-charging from an external source, or seeking repairs. Once a remedy has been put in place, the starter mode of the starter/alternator is again made available to start the IC engine and/or otherwise operate in the system.

DETAILED DESCRIPTION

Figure 1:
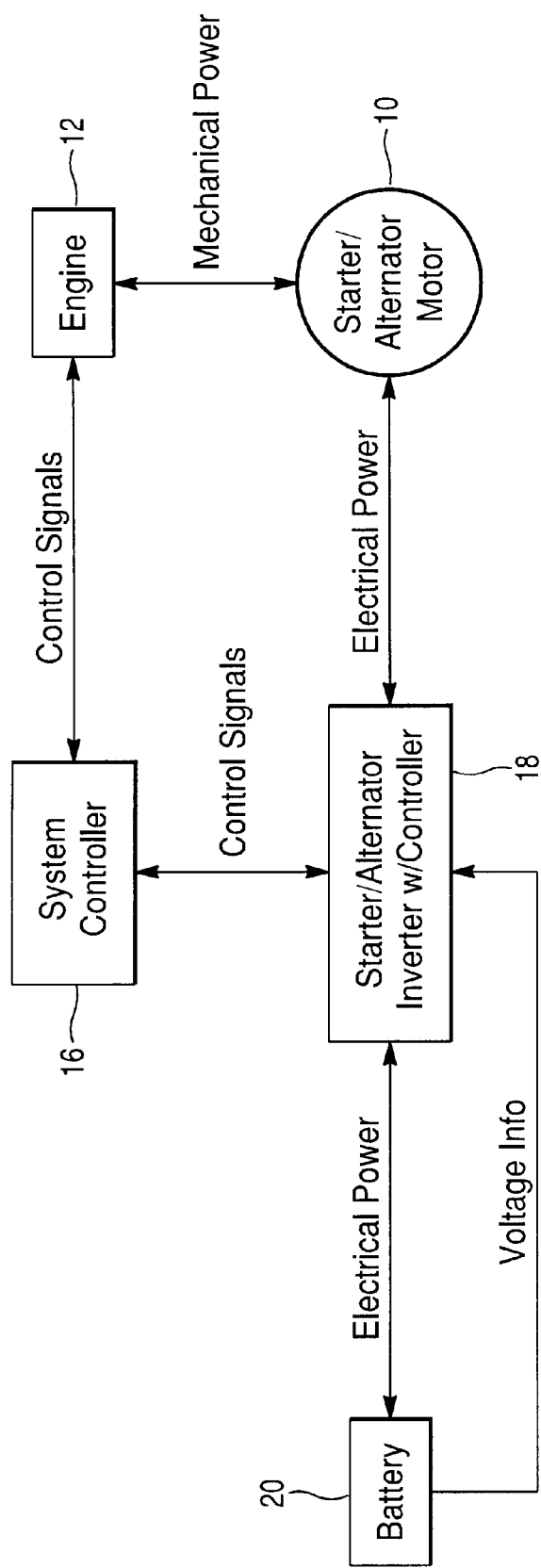
FIG. 1 shows a block diagram of the necessary sensors and hardware to accomplish the present method.
Figure 2:
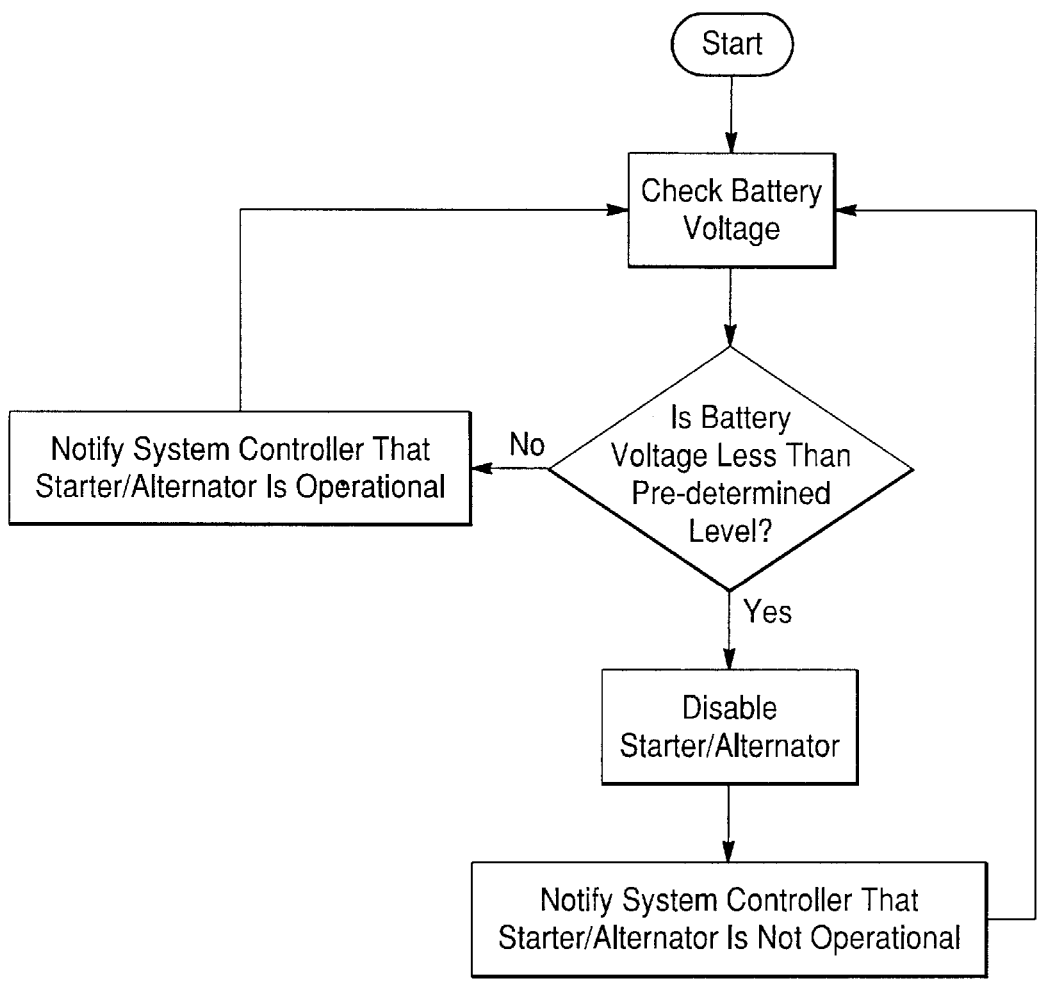
FIG. 2 shows a flow chart of decision making for the method used by the system controller in the present invention to determine bus voltage of the energy storage device and to disable the starter/alternator.

The present invention is directed to a method of controlling a starter/alternator 10 associated with an IC engine 12. The starter/alternator 10 and IC engine 12 form a part of the motive system for a vehicle that has additional electrical components that create electrical load for the starter/alternator 10 to supply. The inverter/controller 18 controls the output of the starter/alternator as the output flows into the electrical system of the vehicle that also includes an electrical storage device 20 (i.e., a battery). A main system controller 16 accepts operational control information from both the IC engine 12 and the starter/alternator controller 18. The starter/alternator controller 18 will send a signal to the main system controller 16 indicating a low voltage condition at the energy storage device 20 and that the starter/alternator is disabled. The main system controller 16, upon receiving an insufficient charge signal for the energy storage device 20, acknowledges that the starter/alternator is disabled in both generation and/or starter mode until a remedy has been obtained. In addition, the system controller supplies necessary warning signals to the vehicle operator to indicate the starter/alternator is no longer operational.

Once the output voltage is detected as being again sufficient, i.e., the voltage has returned to a normal operating range (after the energy storage device has been recharged or replaced), the starter/alternator controller 18 will once again allow operation and notify the main system controller 16 that the starter/alternator system is available.

I claim:

1. A method of preventing a starter/alternator from initiating a starting sequence for an associated IC engine in a system that includes an energy storage device, a starter/alternator, and an IC engine, comprising the steps of:

monitoring the available voltage of the energy storage device;

comparing said monitored voltage to a predetermined threshold voltage;

disabling the starter/alternator in a starter mode when said voltage is below said predetermined threshold voltage, thereby disabling said starting sequence of said associated IC engine and preserving electrical energy in said energy storage device;

providing an indication signal of said disabling of said starter/alternator; and re-enabling operation of said starter/alternator when said monitored voltage exceeds said predetermined threshold voltage.

2. A method as in claim 1, comprising the further step of:

disabling said starter/alternator in alternator mode when said monitored voltage is below a predetermined threshold voltage.

3. A method as in claim 1, comprising the further step of:

replacing said energy storage device.

4. A method as in claim 1, comprising the further step of:

recharging said energy storage device.

* * * * *